United States Patent [19]

Snow et al.

[11] 4,038,817

[45] Aug. 2, 1977

[54] FUEL JETTISON SYSTEM

[75] Inventors: Barton H. Snow; Donald F. Sargisson, both of Cincinnati, Ohio

[73] Assignee: General Electric Company, Cincinnati, Ohio

[21] Appl. No.: 582,606

[22] Filed: June 2, 1975

[51] Int. Cl.² .......................... F02K 3/08; F02C 7/22
[52] U.S. Cl. .......................................... 60/204; 60/261; 244/135 R; 244/136; 137/608; 137/565; 222/318
[58] Field of Search ................... 60/39.09 F, 39.09 R, 60/243, 261, 223; 244/135 R, 136; 222/318; 137/565, 608; 417/252, 305

[56] References Cited

U.S. PATENT DOCUMENTS

| 1,898,805 | 2/1933 | Andrake | 244/135 R |
|---|---|---|---|
| 2,038,998 | 4/1936 | Hammond | 244/135 R |
| 2,138,970 | 12/1938 | Jones | 244/135 R |
| 2,283,502 | 5/1942 | Hughes et al. | 244/135 R |
| 2,814,931 | 12/1957 | Johnson | 60/39.09 F |
| 3,011,308 | 12/1961 | Wotring | 60/243 |
| 3,096,054 | 7/1963 | Ciminaghi | 244/135 R |
| 3,556,444 | 1/1971 | Kopp | 244/135 R |
| 3,627,239 | 12/1971 | Hull | 244/135 R |

Primary Examiner—Carlton R. Croyle
Assistant Examiner—Robert E. Garrett
Attorney, Agent, or Firm—Dana F. Bigelow; Derek P. Lawrence

[57] ABSTRACT

Fuel is selectively jettisoned through the engine of an aircraft by way of a normally closed, solenoid-operated jettison valve which is fed from the boost pump in the engine fuel system. The jettison valve is servo activated by the main fuel flow so that the engine must be running for the opening of the solenoid valve to occur. For an engine having an augmenter, other interlocks are provided to prevent the jettison of fuel when the augmenter is in use and to preclude the ignition function to the augmenter while fuel is being jettisoned.

13 Claims, 4 Drawing Figures

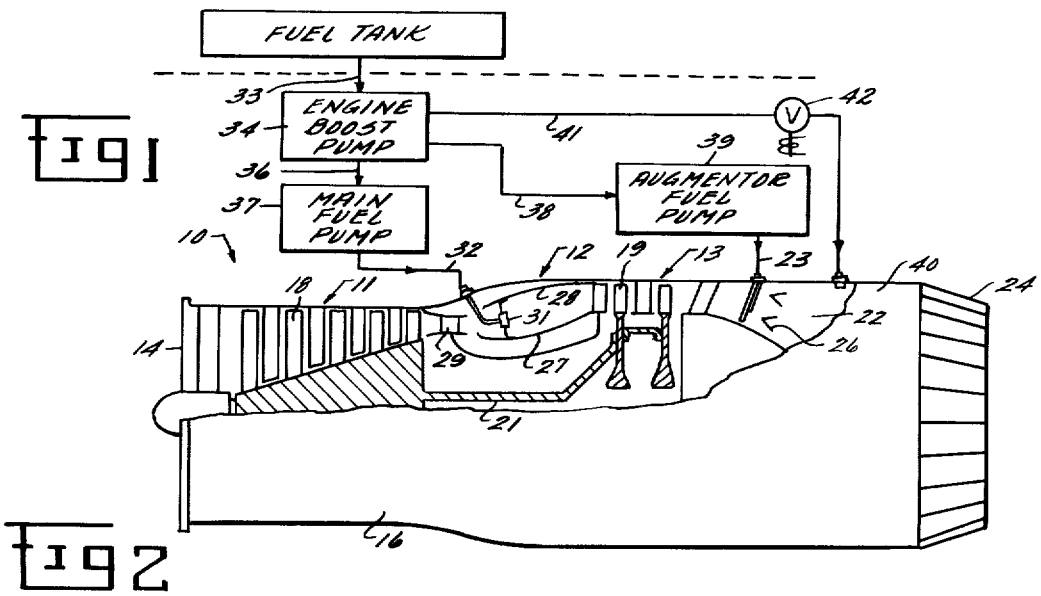
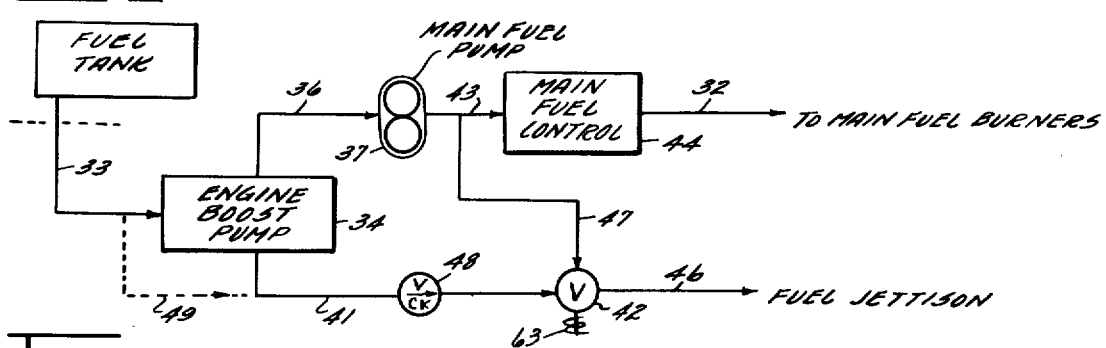
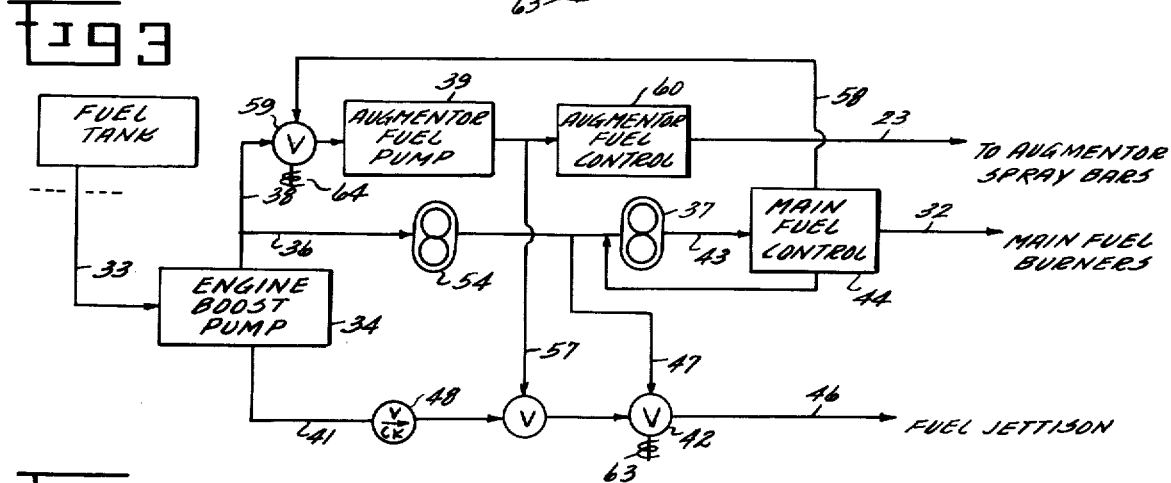
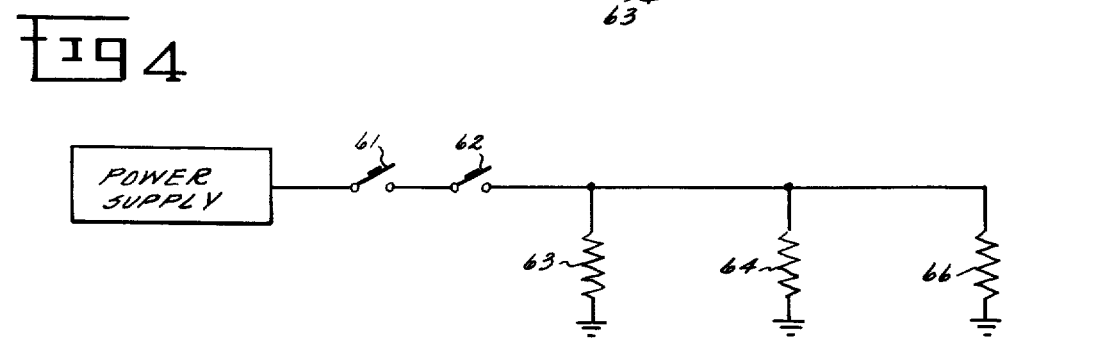

FUEL JETTISON SYSTEM

The invention herein described was made in the course of or under a contract, or a subcontract thereunder, with the United States Department of the Air Force.

BACKGROUND OF THE INVENTION

This invention relates generally to jet engine systems and, more particularly, to fuel systems of jet engine aircraft having fuel jettison provisions.

It is common in aircraft systems design to include provisions for the jettison of fuel. The feature is provided to selectively reduce the overall weight of the aircraft to a level within the capability of the landing gear. This is necessitated when an aircraft having a full load of fuel is forced to land. Another time when a fuel jettison system is used is that prior to an emergency landing wherein it is preferable to reduce the amount of fuel on board to minimize the risk of significant fires. Further, it is of great importance to aircraft which operate out of airfields with short runways and which rely on aerial refueling to fill the tank after take-off of a partially fueled aircraft.

The normal approach for the jettison of fuel has been to provide auxiliary jettison pumps and associated piping to pump fuel from the aircraft fuel tanks to a safe overboard location, usually in the tail of the aircraft or at the ends of the wings. Such a system involves, in addition to the valves and piping, heavy auxiliary pumps which are not used for any other purpose and which comprise a significant load factor and installation expense. Also, the provision of fuel tight joints in aircraft compartments that would not otherwise contain fuel piping adds weight and hazards to safety. Further, to determine how much fuel has been jettisoned, a fuel jettison system generally relies on the existing system fuel tank quantity meters which commonly provide an inaccurate indication. Otherwise, if the jettison fuel flow quantity is desired, extra metering apparatus must be installed in the system.

It is therefore an object of this invention to provide a fuel jettison system which does not significantly add weight to aircraft.

Another object of this invention is the provision in a fuel jettison system for eliminating the use of auxiliary jettison pump, piping, metering apparatus, and associated hazards to safety.

Still another object of this invention is the provision for a fuel jettison system which does not impinge fuel on the airframe during periods of fuel jettison.

Yet another object of this invention is the provision for a fuel jettison system which is designed to be inoperable during periods in which the aircraft is on the ground and, for engines with an augmenter, during periods in which the afterburner is in operation.

Still another object of this invention is the provision for a fuel jettison system which is economical to fabricate and functional in use.

These objects and other features and advantages become more readily apparent upon reference to the following description when taken in conjunction with the appended drawings.

SUMMARY OF THE INVENTION

Briefly, in accordance with one aspect of the invention, a pipe is provided to carry the flow of fuel from the engine fuel booster pump to the tailpipe of the engine where it is discharged without impinging on the engine or aircraft. In this way the auxiliary pumps and associated piping of conventional jettison systems are eliminated. Further, the existing flow meter that is associated with each engine provides an accurate indication of the quantity of fuel that is being jettisoned. Control of the jettison fuel flow is maintained by way of a solenoid valve which is selectively opened by the operator when fuel jettison from the aircraft is desired. An interlock system is included to prevent operation of the valve during periods when the aircraft is on the ground and during periods when the main engine fuel pressure is not adequate.

By another aspect of this invention, in an augmented system, the pipe is provided to carry the flow of fluid from the augmenter pump rather than from the engine booster pump. This is desirable since the use of the extra pump, or pumps in the case of plural engines, allows the use of smaller lines on the engine.

By yet another aspect of the invention additional interlocks are provided to prevent light-off of the augmenter or reverse mode of operation during periods of jettison operation.

In the drawings as hereinafter described, the preferred embodiment and modified embodiments are depicted; however, various other modifications and alternate constructions can be made thereto without departing from the true spirit and scope of the invention.

BRIEF DESCRIPTION OF THE DRAWINGS

FIG. 1 is a schematic representation of a typical jet engine to which the present invention is applicable.

FIG. 2 is a simplified schematic of the jettison system in accordance with a preferred embodiment of the invention.

FIG. 3 is a schematic illustration thereof with additional features added thereto to accommodate an augmenter.

FIG. 4 is a simplified electrical schematic diagram of the interlock portion of the invention.

DESCRIPTION OF THE PREFERRED EMBODIMENT

Referring to the drawings, attention is directed initially to FIG. 1 wherein a gas turbine engine 10 is shown to include, in serial relationship, along the axis of the engine, a core compressor 11, a combustor 12 and a high pressure turbine 13. In operation, air enters the gas turbine engine 10 through an inlet 14 provided by means of a suitable cowling 16 which surrounds the core compressor 11 and high pressure turbine 13 and provides an external casing for the engine. Air entering inlet 14 is compressed by means of rotation of the compressor blades 18 and is thereafter combined with fuel and ignited in the combustor 12. The resulting highly energized gas stream then flows through the turbine blades 19 to drive the compressor 11 by way of a shaft 21. After leaving the turbine 13, pressurized air flows through an afterburner 22 where it is again mixed with fuel by way of an afterburner fuel supply 23, and then ignited to flow out of the nozzle 24 in a high energy state to provide a propulsive thrust to the engine. A flameholder is commonly provided downstream of the afterburner fuel supply and is generally comprised of a pair of annular, radially spaced V-gutters 26 to prevent the flame from being blown out through the nozzle.

Looking more specifically at the combustion system 12, it includes annular inner and outer casings 27 and 28, and fluidly communicates with the core compressor 11 by way of an inlet guide vane 29. Fuel is supplied to the combustor 12 by way of a carburetor device 31 and fuel supply line 32. Considering the flow of fuel as a system, with the interface between engine and aircraft represented by the dashed line of FIG. 1, the fuel originates in the fuel tanks of the aircraft and flows along line 33 to the engine boost pump 34. Here the fuel is pressurized and passed along line 36 to the main fuel pump 37 which further pumps it into the fuel supply line 32. When the engine includes an augmenter, the engine boost pump 34 also supplies by way of line 38 the augmenter fuel pump 39 which then discharges into the augmenter fuel supply line 23. There are, of course, various regulation and control systems which modulate the flow of fuel both to the main engine combustor and to the augmenter, but are not shown in FIG. 1. It should also be understood that the engine boost pump shown in FIG. 1 may be replaced by an airframe boost pump located on the aircraft, and which would pump fuel directly into the main fuel pump 37 on the engine.

The present invention is concerned with the transfer of fuel from the engine boost pump 34, or alternatively from the airframe boost pump (not shown) to the tailpipe 40 of the engine by way of a pipe 41. A valve 42 is placed in the pipe 41 to selectively turn on or turn off the flow of fuel to the tailpipe 40 to jettison fuel when desired. A better understanding of this portion of the system will be gained by reference to FIG. 2.

In operation, fuel is delivered from the aircraft by way of the fuel line 33 to the engine boost pump 34 which further pumps the fuel along line 36 to the main fuel pump 37. From there it is transferred along line 43 to the main engine control 44 which regulates to a predetermined schedule the flow of fuel to the main burner along line 32. A fuel flow meter (not shown) is normally provided to indicate the amount of fuel that is flowing from the fuel tank.

In accordance with the present invention, a second pipe 41 is connected to the discharge of the engine boost pump 44 to selectively jettison fuel from the aircraft by way of jettison pipe 46 and, hence, to the afterburner 40. The flow from the pipe is preferably aimed such that it squirts out the open tailpipe without impinging on engine or aircraft metal. The pressure drop from the boost pump 34 into the tailpipe 40 is preferably sized to provide an adequate jettison flow rate with sufficient restriction to be sure that the engine fuel system also receives an adequate fuel pressure for continued normal flight. Control of fuel flow within the jettison pipe 46 is controlled by the normally closed solenoid valve 42. To open the valve, the pilot turns on a switch to provide power thereto. As a safety measure an activating pipe 47 interconnects the main fuel flow line 43 with the servo valve 42 such that the pressure in the main fuel line 43 activates the servo-activated solenoid valve 42. In this way, the operator is assured that the solenoid valve will not open unless the engine is running with an adequate supply of fuel. As a further precaution, a check valve 48 is preferably installed in the pipe 41 to prevent the backflow of fuel if the exhaust pressure in the jettison pipe 46 exceeds the fuel pressure from the engine boost pump 34.

As mentioned hereinbefore, aircraft systems may have an engine boost pump 34 or an airframe boost pump (not shown) or both. Where an airframe boost pump is provided, and has a sufficient discharge pressure, an alternate fuel supply line 49 (shown in dashed lines) may be provided to deliver fuel to the jettison pipe 46. This arrangement would also avoid the possibility of having to increase the size of the engine-driven boost pump 34 to accommodate the desired flow of jettison fuel. It should be noted that the system is preferably capable of jettisoning fuel at any engine power setting between idle and top speed.

Where the engine system includes an augmenter to boost the power capabilities during certain periods of operation, additional elements are required as shown in FIG. 3. A feed pipe 38 carries fuel from the discharge of the engine boost pump 34 to an augmenter boost pump 52, which further pressurizes the fuel for delivery along line 53 to the augmenter control 39, and hence to the augmenter fuel supply line 23 (see FIG. 1). Where an augmenter is used, it may be desirable to have an additional booster 54 in the main engine fuel system to make up for the pressure drop occasioned by the augmentation system.

In such augmented systems, it is desirable to have certain interlocks to prevent simultaneous operation of the augmented mode of operation and the fuel jettison mode of operation. To prevent the jettison of fuel while the augmenter is in operation, a pressure-operated shut-off valve 56, which is interconnected to the augmenter fuel line 53 by way of a cross over line 57, is placed in the jettison line upstream of the servo valve 42. Whenever the augmenter system is in operation, the pressure on line 53 closes the valve 56 and holds it closed until the augmentation system is shut down.

In order to prevent the supply of fuel to the augmenter while the jettison system is in operation, a signal is transmitted from the main engine control 44 along line 58 to a servo valve 59 to shut down any fuel flow to the augmenter. This is intended to provide assurance that there is no sprayed fuel in the tailpipe, and therefore no ignition. Another safeguard against accidental combustion is that provided in the ignition interlock discussed below.

Another interlock which would preferably be provided is that to prevent simultaneous reverse mode and fuel jettison modes of operation. Such an arrangement could be provided by conventional means as would be understood by one skilled in the art.

Shown in FIG. 4 is an electrical circuitry diagram for the necessary interlock system on an augmented engine. To activate the jettison system both the jettison switch 61 and the squat switch 62 must be closed. The jettison switch 61 is pilot operated and the squat switch 62 is automatically opened whenever the aircraft is on the ground and automatically closed when the aircraft takes off. When these two switches are closed, the jettison switch coil 63 is energized and the solenoid 42 is activated to jettison the fuel as described hereinabove. At the same time, the solenoid coil 64 is energized such that the solenoid 59 shuts off the augmenter pump 52. Also, a relay coil 66 operates to close the contact to inactivate the augmenter ignition, thereby preventing any ignition during the period of fuel jettison operation. Although the method of fuel jettison is such that autocombustion of the jettisoned fuel is unlikely, this interlock will help provide assurance that accidental ignition of the jettisoned fuel does not occur.

What is claimed as novel and desired to be secured by Letters Patent of the United States is:

1. An improved fuel jettison system for an aircraft jet engine of the type having a main fuel line and a fuel supply pump for pumping fuel to the engine, wherein the improvement comprises:

a. pipe means connected to the discharge end of the pump to provide for the overboard discharge of fuel during certain periods of flight;

b. valve means placed within said pipe means to selectively regulate the discharge flow of fuel; and c. means responsive to a predetermined pressure in the main fuel line of the engine to activate the valve means for selective operation.

2. The improved fuel jettison system as set forth in claim 1 wherein said fuel supply pump comprises an engine-driven boost pump.

3. The improved fuel jettison system as set forth in claim 1 wherein said valve means comprises a solenoid valve to be activated by an operator.

4. The improved fuel jettison system as set forth in claim 3 wherein said solenoid valve is servo operated in response to the pressure in the main fuel line of the engine.

5. The improved fuel jettison system as set forth in claim 1 wherein the fuel is discharged into the tailpipe of the engine.

6. The improved fuel jettison system as set forth in claim 1 and including a check valve in said pipe to prevent the flow of fuel from said valve means to said pump.

7. The improved fuel jettison system as set forth in claim 1 wherein said pipe is sized in relation to the capacity of said pump and the fuel requirements of said engine, such that during periods of fuel jettison operation, said engine receives adequate fuel for proper operation.

8. An improved fuel jettison system for an aircraft jet engine of the type having a fuel supply pump for pumping fuel to the engine and to an augmenter wherein the improvement comprises:

a. pipe means connected to the discharge end of the pump to provide for the overboard discharge of fuel during certain periods of flight;

b. valve means placed within said pipe means to selectively regulate the discharge flow of fuel; and c. means to prevent the operation of the augmenter during periods of fuel jettison operation.

9. The improved fuel jettison system as set forth in claim 8 and including means to prevent the initiation of fuel jettison operation during periods of augmenter operation.

10. The improved fuel jettison system as set forth in claim 9 wherein said prevention means includes a servo valve placed in said pipe and activated in response to the fuel pressure to said augmenter.

11. The improved fuel jettison system as set forth in claim 8 wherein said prevention means includes a solenoid valve which is activated during periods of fuel jettison operation to shut off the fuel supply to said augmenter.

12. An improved method of jettisoning fuel from an aircraft having a fuel supply pump for pumping fuel to an engine and to an augmenter, wherein the improvement comprises the steps of:

a. providing a jettison pipe from the fuel supply pump to an overboard location on the aircraft;

b. preventing the operation of the augmenter; and c. pumping at least a substantial portion of the discharge flow of said fuel supply pump along said jettison pipe to provide for the overboard discharge of fuel.

13. An improved method of jettisoning fuel as set forth in claim 12 wherein said jettison pipe leads to, and the fuel is jettisoned out, the tailpipe of the engine.

* * * * *